UNITED STATES PATENT OFFICE.

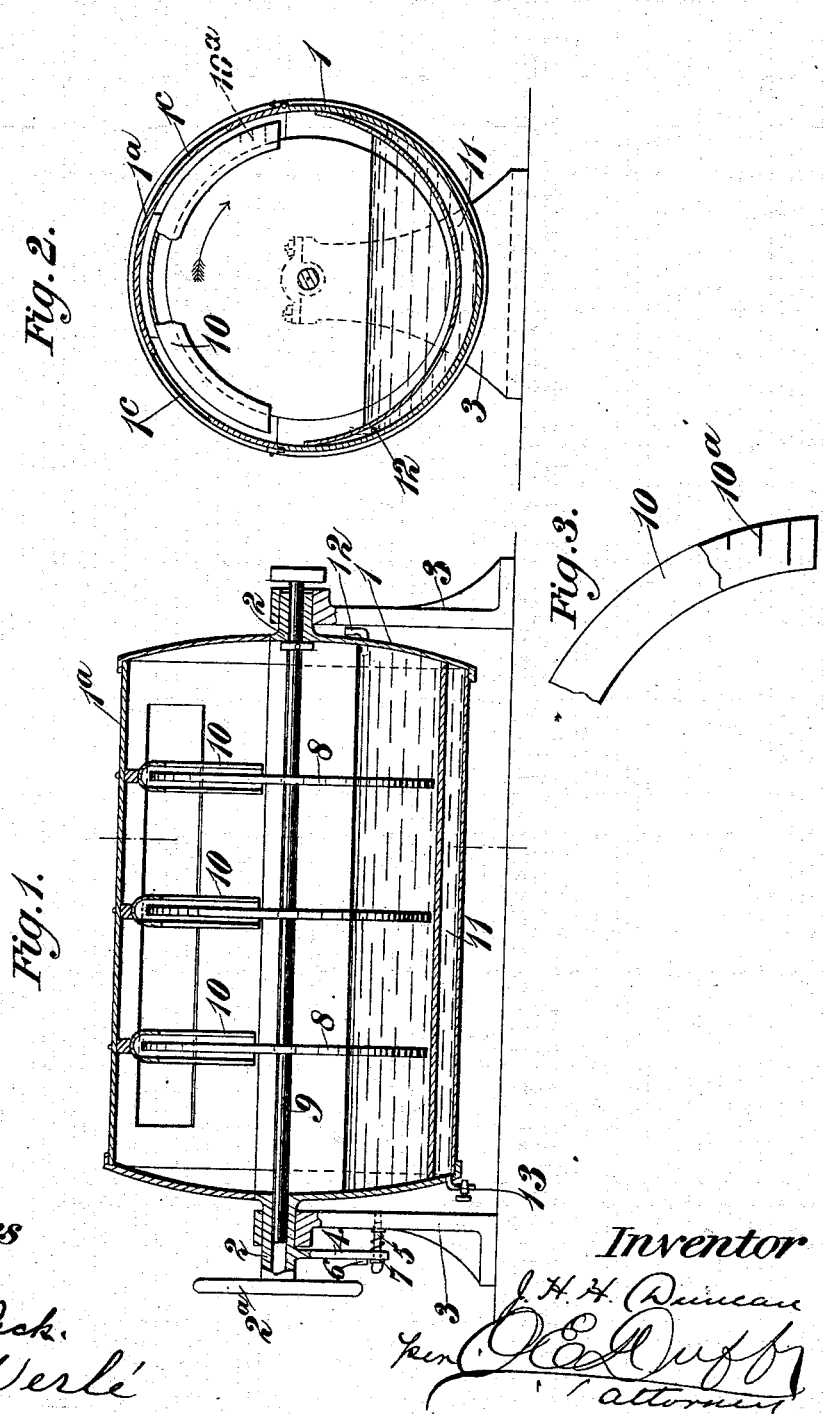

JOHN HENRY HILL DUNCAN, OF LONDON, ENGLAND.

CHURN.

SPECIFICATION forming part of Letters Patent No. 503,654, dated August 22, 1893.

Application filed September 3, 1892. Serial No. 444,961. (No model.) Patented in England July 24, 1891, No. 12,549, and December 1, 1891, No. 20,989; in Germany December 13, 1891, No. 69,058; in France February 24, 1892, No. 219,641, and in Belgium February 24, 1892, No. 98,499.

*To all whom it may concern:*

Be it known that I, JOHN HENRY HILL DUNCAN, a subject of the Queen of Great Britain and Ireland, residing at Coleman Street, in the city of London, England, have invented Improvements in Apparatus for the Manufacture or Production of Butter, (for which I have obtained Letters Patent in Great Britain, dated July 24, 1891, No. 12,549, and December 1, 1891, No. 20,989; in Germany, patent of addition, dated December 13, 1891, to patent dated October 13, 1891, No. 69,058; in France, dated February 24, 1892, No. 219,641, and in Belgium, dated February 24, 1892, No. 98,499,) of which the following is a specification.

This invention relates to improvements in apparatus for the manufacture or production of butter by subjecting cream to the action of revolving or reciprocating disks, or plates partly immersed therein according to the method described in the specification of my former application for patent filed February 26, 1892, Serial No. 422,861.

Apparatus according to my present invention comprises a covered rotary vessel provided with disks arranged to revolve vertically in the said vessel, means for imparting rotary or reciprocating motion independently to said vessel and to the disks therein, and guards arranged concentrically with the said disks, such guards being each of concave or channeled form in cross section and being arranged with its concave side toward the disk to which it is applied so as to insure return to the vessel in which the disks are mounted of all cream thrown outward by centrifugal action.

In the accompanying drawings, Figures 1 and 2 are respectively longitudinal and transverse sections of apparatus constructed according to this invention. Fig. 3 is a sectional view of part of a guard drawn to an enlarged scale.

1 is a closed cylindrical vessel to receive the cream to be converted into butter. It is provided with hollow trunnions 2 by which it is supported in standards 3, and with a hand wheel 2ª fixed to one of the trunnions and by means of which the vessel 1 can be rotated when necessary, as for example when it is desired to wash the butter by rotating it in water. 4 is an arm fixed to one of the trunnions 2 and provided with a spring pin or catch 5 adapted to be engaged with the adjacent standard 3 for the purpose of temporarily locking the vessel in position during the churning operation.

6 is a catch mounted to slide on the arm 4 and adapted to enter a groove in or pass behind a collar 7 on the spring pin or catch 5 when the same is pulled outward, and hold it in its outward and disengaged position.

8 8 are vertically arranged disks of suitable material such as metal, china or wood fixed upon a shaft 9 which is supported in the hollow trunnions 2, 2 of the vessel 1 so that the disks can rotate within the cream in the said vessel. The shaft may be provided with any suitable means for imparting rotary or oscillatory motion thereto. Thus it may be provided with a crank handle so that it may be rotated by hand. I prefer however to employ a spring or clock-work motor of any suitable construction whereby the shaft may be driven automatically.

10, 10 are guards arranged concentrically with the disks and carried by the vessel 1. These guards, which may be of sheet metal, are of concave or channel form in cross section, and are each arranged with its concave side toward the corresponding disk 8 so as to insure return to the vessel of cream thrown outward from the disk by centrifugal action.

To facilitate the regulation of the temperature of the cream, the vessel 1 in which the same is contained, may be formed with a double bottom or jacket 11 into which hot water or other fluid can be admitted when necessary by an inlet 12 and withdrawn by an outlet 13 controlled by a valve. By putting warm or cold water into this jacket and revolving the disks, the temperature of the cream in the vessel 1 can be raised or lowered very rapidly and may be regulated to any degree desired.

I have found in practice that it is advantageous to provide each guard 10 near that end toward which the disk moves, with transverse ribs or projections 10ª as shown in Fig. 3, that serve as baffle plates to more or less break up the cream thrown off from the disk by centrifugal action, and to thereby facilitate its conversion into butter. As the butter begins to form however, the speed of the disk should be reduced so that cream will no longer be thrown against the said baffle plate or plates.

To enable the progress of the churning operation to be watched, the cover $1^a$ of the vessel 1 may advantageously be provided with glazed sight holes $1^c$.

As will be obvious the closed vessel 1 may be made relatively shorter than shown and be provided with one disk only if desired.

What I claim is—

1. Apparatus for making butter, comprising a covered vessel mounted to rotate, a rotary shaft extending through said vessel and carrying a disk, a curved guard of concave form in cross section arranged to partly surround said disk, and a locking device for temporarily fixing said rotary vessel substantially as herein described.

2. Apparatus for making butter, comprising a covered vessel, a rotary shaft located therein, vertically arranged disks fixed to said shaft, and concave guards fixed externally to and concentric with said disks substantially as herein described.

3. Apparatus for making butter, comprising a covered rotary vessel, bearings wherein said vessel can turn, a series of disks fixed upon a shaft mounted to turn in said vessel, concave guards each arranged externally to and concentric with one of said disks and means for temporarily fixing said vessel substantially as herein described.

4. Apparatus for making butter, comprising a rotary cylindrical vessel having a movable cover and a jacketed bottom, standards wherein said vessel can turn, a series of disks fixed upon a shaft mounted to turn within said vessel, concave guards fixed to said cover and each arranged externally to and concentric with one of said disks, and means for temporarily fixing said vessel substantially as herein described.

5. Apparatus for making butter, comprising a rotary cylindrical vessel, a series of vertical disks fixed upon a shaft mounted to turn within said vessel, and a series of fixed guards arranged to partly surround said disks and each provided with one or more baffle plates such as $10^a$, substantially as herein described for the purpose specified.

6. Apparatus for making butter, comprising a rotary cylindrical vessel having a hinged cover and jacket, standards wherein said vessel can turn, means for rotating said vessel, a locking device adapted to temporarily fix said vessel, a series of disks fixed upon a horizontal shaft extending through said vessel, and a series of concave guards fixed externally to and concentric with said disks and each provided with one or more baffles such as $10^a$ substantially as herein described for the purpose specified.

In testimony whereof I have signed my name to this specification in the presence of two subscribing witnesses.

JOHN HENRY HILL DUNCAN.

Witnesses:
 CAMPBELL A. ROBERTSON,
11 *Oakhill Park, N. W., accountant.*
 J. A. CAMPBELL,
39 *Coleman Street, E. C., Articled Clerk.*